United States Patent [19]

Savin et al.

[11] Patent Number: 5,024,604

[45] Date of Patent: Jun. 18, 1991

[54] NO-LOAD BREAKABLE ELECTRICAL CONTACT ESPECIALLY FOR CONNECTED APPLIANCES OR VEHICLES

[75] Inventors: Antoine Savin, Paris; Jacques Salaun, Le Mans, both of France

[73] Assignee: Carrier Kheops Bac., Nanterre Cedex, France

[21] Appl. No.: 440,226

[22] Filed: Nov. 22, 1989

[30] Foreign Application Priority Data

Nov. 25, 1988 [FR] France .............................. 88 15453

[51] Int. Cl.$^5$ .......................................... H01R 13/627
[52] U.S. Cl. .................................. 439/345; 439/180; 439/923
[58] Field of Search ................ 439/180, 923, 153–155, 439/348, 345

[56] References Cited

U.S. PATENT DOCUMENTS 3,206,540  9/1965  Cohen .............................. 439/345 X
3,781,039 12/1973  Locke et al. ..................... 439/348 X Primary Examiner—Steven C. Bishop
Attorney, Agent, or Firm—Scully, Scott, Murphy & Presser

[57] ABSTRACT

The invention relates to an electrical contact intended especially for connecting at least two coupled or linked appliances or vehicles electrically.

This contact comprises a first conventional electrical contact part (1, 7) and a second part (11, 13) adjacent to the contact part and forming a reversible mechanical junction for the electrical contact, the junction being makable manually under no voltage and breakable under no voltage in response to a specific pulling force.

4 Claims, 3 Drawing Sheets

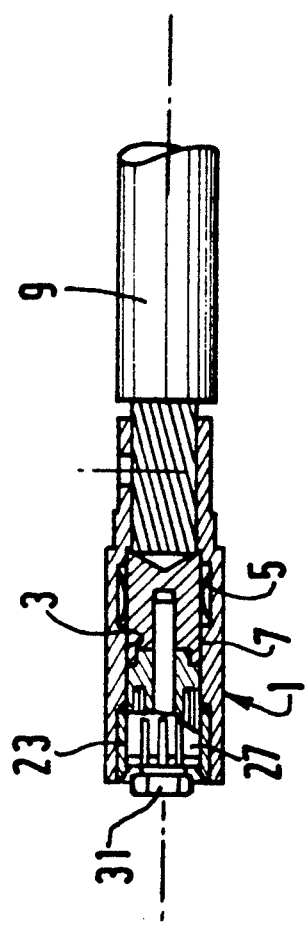
FIG_2
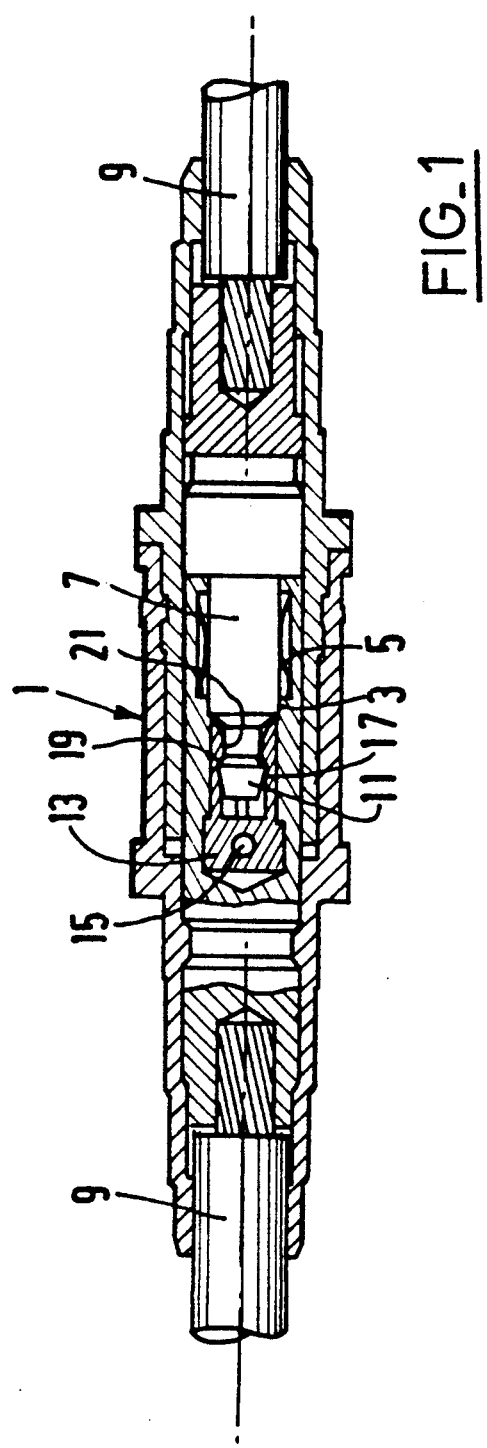
FIG_1

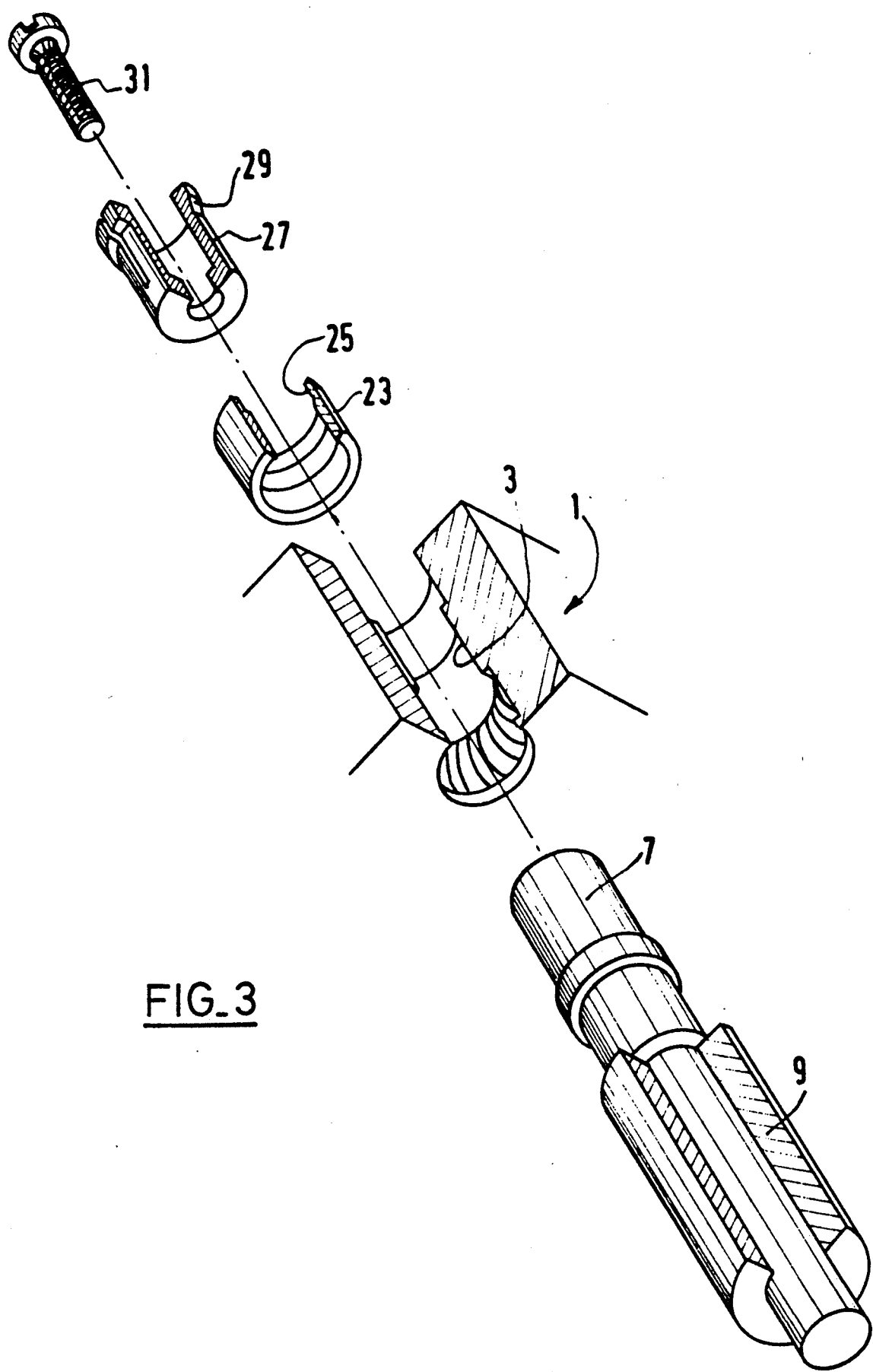
FIG_3

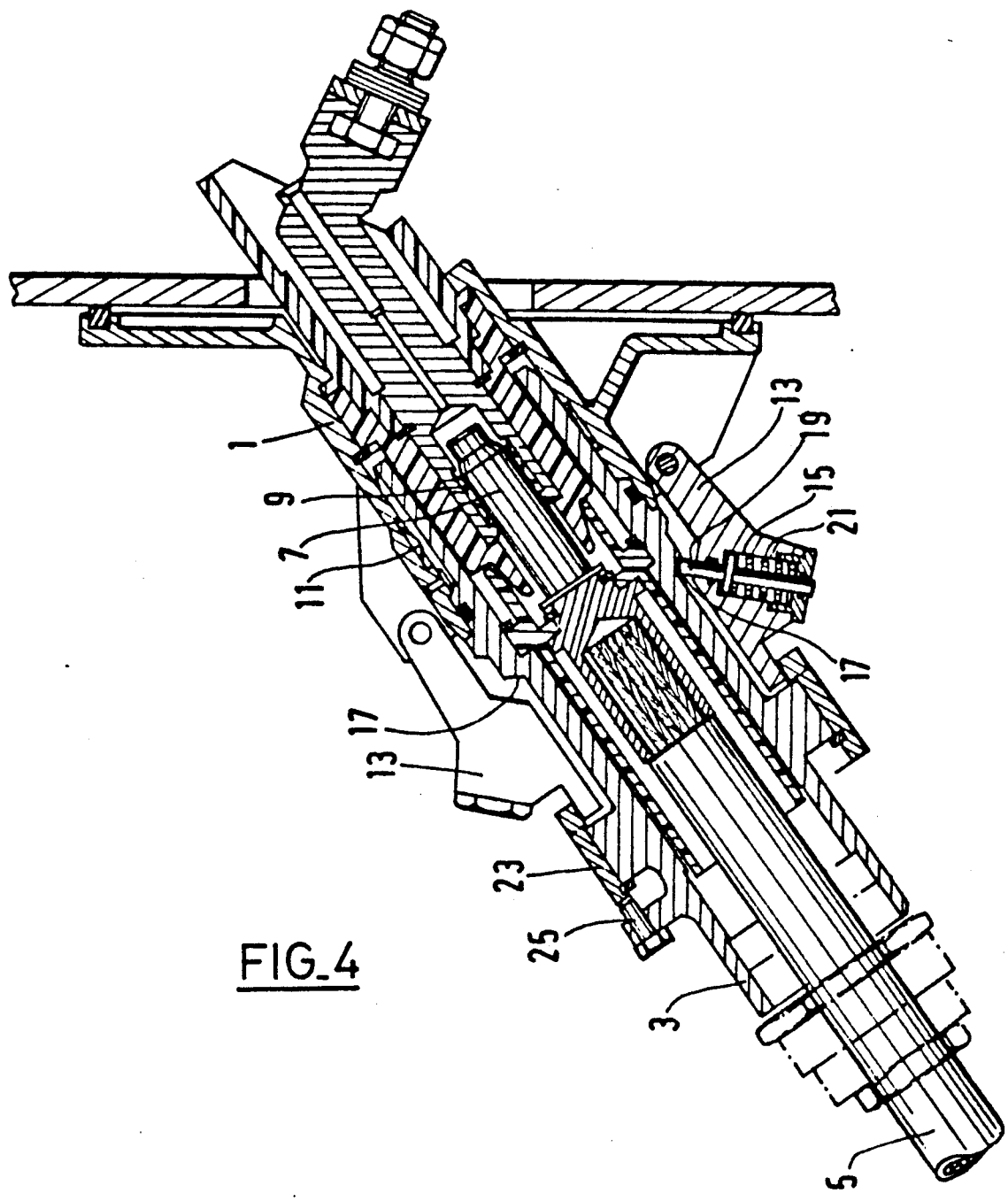
FIG_4

NO-LOAD BREAKABLE ELECTRICAL CONTACT ESPECIALLY FOR CONNECTED APPLIANCES OR VEHICLES

The present invention relates to a no-load bearable electrical contact especially for connected appliances or vehicles, which, in particular, allows the automatic safety disconnection of the contact elements for electrical connection between the said appliances or vehicles, in such a way that their uncoupling or separation can be carried out without damage to this contact or to its fastening accessories.

Such a contact is especially useful in trains of vehicles or vehicles and trailers which have to be uncoupled quickly in the event of a serious malfunction or accident, such as a fire occurring on board one of the vehicles, in order to prevent it from spreading.

Conventional connectors or electrical contacts are usually locked closed, in such a way that an uncoupling of the vehicles without the opening of the constant inevitably causes the cables to be torn off in the region of the connector and of the connector support and sometimes further up the line, consequently requiring a complete repair of the electric installation.

The object of the invention is to overcome this disadvantage by providing a new electrical contact element intended especially for connecting at least two coupled or linked appliances or vehicles electrically, characterized in that it comprises a first conventional electrical contact part and a second part adjacent to the contact part and forming a reversible mechanical junction for the electrical contact, the junction being makable manually under no voltage and breakable under no voltage in response to a specific pulling force.

Of course, the mechanical junction part is calibrated for a pulling force compatible with the cross-section and type of the input/output cables, taking into account the operating criteria, in order to ensure a correct retention of the electrical contact so as to withstand the normal operating phases and also the operating conditions (heat, moisture, corrosion, etc).

Such a contact thus makes it possible to break the electrical connection between connected appliances or vehicles automatically and without damage, this being achieved without any outside intervention. Their quick separation does not cause mechanical damage to the contact and its fastening accessories as known at the present time. Secondly, it is easy for the contact to be put into operation again when the said appliances or vehicles are recoupled.

It goes without saying that the contact must be breakable under no voltage or under no load, so as not to give rise to electrical malfunctions (arcing, fire, etc).

As mentioned above, the electrical contact part is conventional, being designed for all types of electrical contacts with pins and receptacles or with pressure contact, and is suitable for low and high intensities and for all industrial direct-current or alternating-current voltages. It comprises a fixed part with an elastic or smooth receptacle contact or with a pressure contact, connected to a cable or an electrical conductor element, and a movable part interacting in contact with the said fixed part, this part being composed of an elastic or smooth cylindrical pin or of a pressure contact element connected to a cable or conductor element ensuring electrical continuity.

The mechanical part making the junction is composed of a set of two components of respectively male and female type, interacting with one another in mutual engagement as a result of elastic deformation, one of the components being secured to the fixed contact part and the other to the movable contact part.

According to a first version, the male element is a non-deformable steel endpiece of ogival form, of a maximum diameter smaller than that of the receptacle. The female element is an expandable socket receiving the said endpiece elastically and allowing it to be extracted only under a specific pulling force. Preferably, the endpiece is secured to the movable contact part (at the pin end), whilst the expandable socket is dowelled to the receptacle at the rear end of the latter.

According to a second version, these components advantageously comprise a ring secured to the fixed part and a complementary deformable socket of a diameter smaller than that of the receptacle, located at the end of the movable contact so as to be secured to the latter, the socket being capable of being engaged into the ring from the rear of the fixed contact part, with the fitting of an assembly element after the manual connection of the movable contact to the fixed part, and of being separated by elastic extraction upon disconnection under a pull value of specific calibration.

The said pull value of specific calibration affords the capability of safety disconnection without damage to the electrical installation appropriate to the appliances or vehicles in question.

According to a third version, the mechanical junction part has external engagement elements independent of the actual electrical contact part.

The said engagement elements advantageously comprise at least two articulated arms secured to the fixed part of the contact (on the base side) and arranged on its periphery, for example diametrically opposite one another, these arms being equipped with spring pushers capable of engaging elastically during the closing of the contact onto a retention profile formed on the body of the movable contact part (disconnectable plug) when its arms are locked during operation and turned down into position along the body of the fixed contact part, the pushers being calibrated at a specific force in order to allow the safety release of the said part of the contact under a given extraction force.

The said retention profile is advantageously of conical form, and the pushers have a telescopic finger turned towards the said profile.

The locking of the articulated arms is achieved by means of a ring mounted rotatably on the movable contact part or plug, this ring being equipped with notches allowing the end part of the arms to pass when they are being put into the locking position, and keeping them in the locked position by their end under its lower surface after rotation.

This last arrangement ensures good accessibility and visibility of the engagement elements of the mechanical junction of the contact, and the breaking force can be adjusted to be high. Plugging remains manual, the arms being swung out of engagement, and the force employed is that required for the normal connection of the electrical contact part, namely the cylindrical pin into the elastic receptacle. In the event of accidental extraction (under no voltage) of the contact effected via the connecting cables on the plug side, the two telescopic pushers are pushed back allowing the plug to move back a few millimeters. The two arms held by their end are then freed from the grasp of the rotary ring, releasing all mechanical retaining stress for the purpose of subsequently easily extracting the plug automatically.

The invention is illustrated hereafter by means of exemplary embodiments and with reference to the accompanying drawings in which:

FIG. 1 is a view in longitudinal mid-section of a breakable contact according to the invention, in the first version;

FIG. 2 is a view similar to that of FIG. 1 for an alternative embodiment (second version), and FIG. 3 is an exploded view of the contact of FIG. 2.

FIG. 4 is a view, similar to that of FIG. 1, of an alternative embodiment (third version).

The contact illustrated in FIG. 1 is designed so that the contact junction can be broken at a pull value of relatively low calibration of between 100 and 150 daN, plugging being carried out manually by the pressure engagement at a push value of below 45 daN.

It comprises a fixed part 1 composed of a receptacle 3 with its conductive contact lamellae 5 and a movable part 7 of the cylindrical-pin type penetrating into the said receptacle as far as it will go. These contact elements are suitably connected to the current input and output conductor cables 9. The movable contact pin 7 possesses, at its end, a non-deformable nose 11 or endpiece (made of treated steel), with a double front and rear conical development, engaging elastically into a deformable ring or expandable socket 13, likewise made of steel, secured by means of a dowel 15 to the fixed contact part 1 at the receptacle end. The cone angle of the forwardly directed nose part 17 is small, to allow easy manual penetration of the endpiece 11 into the receiving ring 13 which experiences elastic deformation during the insertion. The cone angle of the rear part 19 of the nose is larger and constitutes the conical part of actual retention of the junction, the said part bearing on the radial inner protuberances 21 of the ring. The latter is split longitudinally on the periphery, thereby ensuring its capacity for elastic deformation during the insertion or extraction of the nose, the latter phase corresponding to the breaking of the junction or contact. The maximum diameter of the nose is smaller than that of the receptacle, so that under no circumstances is the latter affected by the extraction of the nose from the receptacle.

The embodiment of FIG. 2 is intended for pulling forces for breaking the junction of the contact which are within a range of higher values of between 250 and 300 daN.

This alternative version illustrated in FIGS. 2 and 3 comprises elements similar to the contact of FIG. 1 and designated by the same references, namely the fixed contact part 1 with a receptacle 3 and the movable contact part with a cylindrical pin 7 received by the receptacle 3.

The mechanical retention device is joined to the end of the movable contact 7 after the latter has been connected up in the receptacle of the contact. It is composed of a cylindrical steel ring 23 fitted at the rear end of the receptacle of the fixed part. This ring has a conical bearing zone 25 in the region of its entry orifice. An elastic bush or socket 27 split longitudinally on the periphery is received by this ring and penetrates into the receptacle at the rear of the latter; this socket has a conical bearing surface 29 which is located in the region of its rear end and which is complementary to the bearing zone 25 of the ring. The maximum outside diameter of the conical bearing surface of the socket is smaller than that of the receptacle.

An internal thread is formed at the end of the movable pin 7; it makes it possible, after connection, to secure the said movable pin to the expandable socket 2 by means of a screw 31 which clamps itself against its rear end.

Once this has been done, the movable part is secured to the fixed contact part, with an allowance made for joining the expandable socket to the ring. The calibration of the force required to extract the socket on the ring is therefore a function of its elastic deformation during the passage of its conical bearing surface over the corresponding bearing zone of the ring. During extraction, the receptacle of the contact is not affected by the passage of the expandable socket (of smaller diameter).

After the junction has been broken, the contact, which has not undergone any damage, can be put into operation again very easily. It is sufficient to plug the movable part into the fixed contact part, insert the socket into the ring and finally clamp the screw 31 against the socket so that it is secured to the movable contact part.

The foregoing clearly shows the intended uses of such a contact, for example, on vehicles in a train or with trailers.

With the contact being located at the trailer side in a supporting terminal, for example if it becomes necessary to separate the towed carriage urgently, the coupling being assumed to be released and the vehicles moving apart, the separating pulling tension will be exerted on the breakable contact which will open without damage under the precalibrated safety pulling force. The separation will not cause any malfunction on the other electrical connection elements which will be perfectly capable of resuming their operation when the electrical circuit between the said vehicles is closed again.

As illustrated in FIG. 4 for another alternative embodiment, the breakable electrical contact is composed essentially of a fixed part or base 1 fastened to a supporting wall and of a complementary movable part or plug 3 connected to a flexible electrical cable 5.

The inner electrical contact part is of the type with a pin 7 and a conventional elastic receptacle 9, the receptacle being located on the base side and the cylindrical male pin on the plug side. A ground contact 11 insulated from the preceding elements is likewise made via the metal casing of the plug and of the base.

The breakable mechanical locking of the contact is obtained by means of an outer and therefore externally visible retention device. This device is composed of a set of two arms 13 articulated on the body of the base and equipped with spring pushers 15 and of a conical bearing surface 17 formed on the body of the plug. The pushers are arranged diametrically opposite one another and each have a telescopic finger 19 stressed downwards by a spring 21 enclosed on the inside. When the arms are brought into the locking position laid against the body of the base, the fingers are turned towards the conical bearing surface, thus keeping the movable plug in its base. This conical bearing surface is treated so as to obtain a hardness close to that of steel.

A rotary ring 23 is fitted on the body of the plug in the vicinity of the ends of the articulated arms of the base. This ring is a collar for locking the arms during normal operation. It possesses notches on its edge, allowing the passage of the arms and therefore the turning down of the arms (from their end) under it at a given angle of rotation, and when it is rotated it locks the arms in position by means of its lower surface. A stop screw 25 fastened to the body of the plug locks the rotation of the ring and thereby ensures the constant locking of the arms. The pushers are calibrated (preferably at the factory) so that the contact junction can be broken under a pulling force of 200 to 250 daN, the latter value being adjustable up to a further 1000 daN as required, depending on the strength of the contact.

The contact functions in an especially simple way.

The plugging of the contact is carried out manually in the conventional way under a pushing force of the order of 40 daN, necessary for engagement of the male pin into the receptacle and for the ground contact obtained by means of the parts of the outer metal casing. The arms are subsequently swung over in order to bring them into a substantially parallel position along the body of the contact, at the same the ensuring that the pusher fingers 19 bear on the conical retaining bearing surface 17. The arms are thereafter locked in position by rotating the rotary ring and then the screw for immobilizing the ring is tightened. The mechanical junction is now ready for operation and for performing the function of the automatic safety breakability of the contact under no voltage and in response to a pulling force set at 200-250 daN. Under these extraction circumstances, the two pushers are pushed back and allow the plug to move back axially. The ends of the arms then come free of the rotary ring 23, thereby releasing the breakable mechanical junction. The plug then withdraws easily from its base.

After extraction, the breakable plug, which has not undergone any damage, can be put into operation again very easily by repeating the preceding cycle for installing the contact.

The foregoing clearly shows the advantages of the breakable electrical contact according to this last version in particular, in terms of both the accessibility and the visibility of the engagement elements of the breakable mechanical junction.

It should be noted that the contact of the invention is in no way limited to the examples described, particularly as regards the permitted range of breaking pull values, but that, on the contrary, it embraces all its alternative versions coming within the scope of the following claims.

We claim:

1. Electrical contact for electrically connecting at least two coupled appliances or vehicles; comprising a first electrical contact part and a second part located adjacent said electrical contact part and forming reversible mechanical junction means for the electrical contact, said mechanical junction means being configured so as not to affect the integrity of the electrical contact part during extraction or contact-breaking, said mechanical junction means including external engagement elements independently of the electrical contact part, said engagement elements including at least two articulated arms secured to the periphery of the electrical contact part diametrically opposite each other, said arms having spring pushers connected thereto for engaging elastically during the closing of the contact onto a retention profile on the body of a movable contact portion of said electrical contact part upon the arms being locked during operation and positioned along the body of a fixed contact portion of said electrical contact part, said spring pushers being calibrated to a specific force in order to allow the safety release of the said movable portion of the electrical contact part responsive to a specified separating force, whereby the junction is makeable manually under no voltage and breakable under no voltage in response to said separating force.

2. Electrical contact according to claim 1, said retention profile is of conical configuration, and said spring pushers each have a telescopic finger facing towards said profile.

3. Electrical contact according to claim 1, wherein said articulated arms are locked to the periphery of said electrical contact by a ring mounted rotatably on the movable contact portion, said ring having notches therein facilitating the end portion of the arms to pass therethrough for placing into the locking position, and maintaining said arms in the locked position at the ends thereof below the lower surface of the ring after predetermined rotation thereof.

4. Electrical contact according to claim 3, wherein said ring is secured against rotation by a screw fastened to the body of the fixed contact portion.

* * * * *

UNITED STATES PATENT AND TRADEMARK OFFICE
CERTIFICATE OF CORRECTION

PATENT NO. : 5,024,604

DATED : June 18, 1991

INVENTOR(S) : Antoine Savin, et al.

It is certified that error appears in the above-identified patent and that said Letters Patent is hereby corrected as shown below:

Column 4, line 5: "socket 2" should read as --socket 27--

Column 5, line 19: "same the" should read as --same time--

Signed and Sealed this

Third Day of November, 1992

*Attest:*

DOUGLAS B. COMER

*Attesting Officer*    Acting Commissioner of Patents and Trademarks